(12) United States Patent  
Lobovsky et al.

(10) Patent No.: US 8,293,107 B1
(45) Date of Patent: Oct. 23, 2012

(54) FIBERS WITH AXIAL CAPILLARY SLIT THAT ENHANCES ADSORPTION, ABSORPTION AND SEPARATION

(75) Inventors: Alex Lobovsky, Westfield, NJ (US); Wesley P. Hoffman, Palmdale, CA (US); Phillip G. Wapner, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 254 days.

(21) Appl. No.: 12/684,993

(22) Filed: Jan. 11, 2010

Related U.S. Application Data (63) Continuation-in-part of application No. 11/256,280, filed on Oct. 19, 2005, now abandoned.

(51) Int. Cl.
 *B01D 63/02* (2006.01)
(52) U.S. Cl. ......... 210/321.88; 210/321.79; 210/321.8; 210/321.89; 210/500.23; 96/10; 428/397; 428/400; 428/401; 264/176.1; 264/177.1; 264/177.13; 264/177.14
(58) Field of Classification Search ............ 210/321.79, 210/321.8, 321.88, 321.89, 500.23; 96/10; 428/397, 400, 401; 264/176.1, 177.1, 177.13, 264/177.14
See application file for complete search history.

(56) References Cited

U.S. PATENT DOCUMENTS

| | | | | |
|---|---|---|---|---|
| 3,220,173 A * | 11/1965 | Pitzl | ............................. | 57/248 |
| 4,101,346 A * | 7/1978 | Dorsey, Jr. | ................... | 148/274 |
| 4,254,181 A * | 3/1981 | Bromley et al. | ............. | 428/371 |
| 4,325,765 A * | 4/1982 | Yu et al. | ........................ | 156/167 |
| 4,648,830 A * | 3/1987 | Peterson et al. | ............. | 425/464 |
| 4,707,409 A * | 11/1987 | Phillips | ........................ | 428/397 |
| 5,057,368 A * | 10/1991 | Largman et al. | ............. | 428/397 |
| 5,124,205 A * | 6/1992 | Raynolds et al. | ............ | 428/364 |
| 5,127,325 A * | 7/1992 | Fadner | ......................... | 101/348 |
| 5,154,908 A * | 10/1992 | Edie | ......................... | 423/447.1 |
| 5,156,831 A * | 10/1992 | Fain et al. | ................. | 423/447.1 |
| 5,200,248 A * | 4/1993 | Thompson et al. | ........... | 428/131 |
| 5,268,229 A * | 12/1993 | Phillips et al. | ............... | 428/400 |
| 5,385,175 A * | 1/1995 | Rivero et al. | ................ | 138/145 |
| 5,496,627 A * | 3/1996 | Bagrodia et al. | ............ | 442/337 |
| 5,744,406 A * | 4/1998 | Novak | ......................... | 442/121 |
| 5,846,427 A * | 12/1998 | Kessler et al. | ............... | 210/645 |
| 5,972,505 A * | 10/1999 | Phillips et al. | ............... | 428/397 |
| 5,977,429 A * | 11/1999 | Phillips et al. | ............... | 604/370 |
| 6,093,491 A * | 7/2000 | Dugan et al. | ................. | 428/397 |
| 6,296,821 B1 * | 10/2001 | Hendricks et al. | ........... | 423/237 |
| 6,379,564 B1 * | 4/2002 | Rohrbach et al. | ............ | 210/765 |
| 6,755,894 B2 * | 6/2004 | Bikson et al. | .................... | 95/52 |
| 6,890,436 B2 * | 5/2005 | Komatsu et al. | ........... | 210/500.41 |
| 6,982,787 B1 * | 1/2006 | Wapner et al. | ................ | 356/138 |
| 7,524,417 B2 * | 4/2009 | Sunohara et al. | ........ | 210/321.79 |
| 7,608,189 B2 * | 10/2009 | Seidel et al. | .................. | 210/651 |

* cited by examiner

*Primary Examiner* — John Kim (74) *Attorney, Agent, or Firm* — Bart Hersko (57) ABSTRACT

New fluid separation devices and absorption materials are disclosed. Hollow fibers with an axial capillary slit act as very high efficiency absorption materials, as well as high-surface-area fluid separation devices. The hollow fibers with an axial capillary slit are constructed to preferentially absorb or repel different fluids and arranged to maximize that action over a plurality of fibers to separate different fluids. These separation devices can also function as injection devices and very effective micro-reactors.

29 Claims, 8 Drawing Sheets

Material 212
 Material 214

FIBERS WITH AXIAL CAPILLARY SLIT THAT ENHANCES ADSORPTION, ABSORPTION AND SEPARATION

CROSS-REFERENCE TO RELATED APPLICATIONS

This application is a continuation-in-part of U.S. patent application Ser. No. 11/256,280 filed Oct. 19, 2005, now abandoned which is herein incorporated by reference.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fluid absorption, adsorption and separation devices, and more particularly to hollow fibers having an axial slit-shaped capillary along a substantial section of the fiber's length that provides an entrance from the fiber exterior to at least one internal fiber compartment. Such fibers act as very high efficiency absorptive materials, as well as high-surface-area fluid separation devices.

Absorbent fibers in the form of hollow fibers and solid fibers with various cross-sectional shapes have found use in numerous health and industrial applications, such as, towels, diapers, feminine napkins, wound dressings and spill clean-up. Fibers with high absorption capacity have been described, for example, in U.S. Pat. Nos. 4,707,409; 5,124,205; 5,200,248; 5,268,229; 5,496,627; 5,972,505; 5,977,429; 6,093,491; and 6,296,8211.

In addition, there is patent literature utilizing various fiber cross-sections encompassing features, such as, ribs, wings, lobes, grooves and channels on the exterior of the fiber to adsorb liquids. For example Phillips et al. describe fibers with spines and arms (U.S. Pat. No. 6,890,436) to adsorb and transport aqueous liquids. Other patents describe "C"-shaped (U.S. Pat. No. 5,156,831) and multi-lobal cross-sections (U.S. Pat. No. 3,220,173, U.S. Pat. No. 4,648,830, U.S. Pat. No. 5,057,368, U.S. Pat. No. 5,154,908, and U.S. Pat. No. 6,379,564), which can be filled with a liquid or particulates (U.S. Pat. No. 6,379,564) that are able to filter or treat a liquid that surrounds the fiber. However, it should be noted that in order to hold the liquid or particulates in the fiber cavities, the lobes of the multi-lobed fibers must be sized small enough to hold these materials in the fiber by capillary forces. Thus, the capillary in these fibers is the internal cavity of the fiber.

Since the cavity holding the liquid or particulates is formed by lobes or circumferential extensions on the lobes, this limits the maximum potential diameter of the fiber, which in turn limits the internal capacity of the fiber. In addition, since it is very difficult to extrude a multi-lobe fiber with narrow separation between the lobes due to polymer rheology constraints, they are usually limited to three or a maximum of four lobes.

In the prior art there are also hundreds of patents in the literature that describe the use of permeable hollow fibers to separate or purify fluids based on permeability through the walls of hollow fibers. These fibers are used principally in the dialysis of blood (U.S. Pat. No. 7,524,417), gas separation (U.S. Pat. No. 6,755,894), the purification of water (U.S. Pat. No. 6,890,436) and blood (U.S. Pat. No. 7,608,189), as well as in the separation of blood components (U.S. Pat. No. 5,846,427).

Since these fibers function on the basis of a permeable wall, there are many applications where they cannot be used. For example, in separating immiscible liquids from one another. Thus, a need exists to be able to separate one fluid from another on the basis of surface tension and wettability. This will require a non-porous hollow fiber with a specific surface composition, with high internal capacity, and numerous capillary entrances so that access to the internal cavities will be rapid. This is not possible with the prior art.

The present invention describes fibers with an axial capillary slit that behaves physically as if a capillary existed along the entire length of the fiber. Such a capillary slit along the entire length of a hollow fiber, instead of a capillary opening in only the ends of a hollow microscopic fiber, improves the efficiency and rate of fluid entering the hollow fiber by many orders of magnitude. This greatly increases the usefulness of these fibers over the prior art in the areas of adsorption, absorption and fluid separation.

U.S. patent application Ser. No. 10/435,008, titled "Separation Devices, (abandoned), describes separation devices which can separate fluids according to how they wet the inner walls of capillaries, as well as their chemical, electrical or magnetic selectivity. For a fluid that does not wet a particular capillary wall, the minimum cross-sectional dimension of that capillary can also be used as a separation mechanism because the pressure needed to force a non-wetting liquid into the capillary depends on its minimum cross-sectional dimension. That is, the pressure ($P_c$) required to force a non-wetting fluid into a cylindrical capillary is dependent on the minimum cross-sectional radius ($r_c$), the surface tension of the liquid ($\gamma$) and the contact angle ($\theta$) that the liquid makes with the material that it is exposed to on the inner wall of the capillary. This dependence is expressed by the equation:

$$P_c = 2\gamma \cos \theta / r_c \quad (1)$$

For highly non-circular capillaries such as slits, this equation can be generalized to:

$$Pc = 2\gamma \cos \theta / d \quad (2)$$

where the radius has now been replaced by (d) which is the minimum slit dimension.

Fluid separation devices based on admittance/exclusion are described in the Separation Devices patent application. In those devices, a fluid stream or mixture that impinges on the ends of the capillaries at the entrance face of the fluid separation device can be separated on the basis of the exclusion of one or more components of the fluid stream or mixture by certain capillaries in the fluid separation device entrance face. This selective exclusion from discrete capillaries in the separation device face can be used to separate the components of two phase flows.

To function as a fluid separation device and separate fluids on the basis of their exclusion from certain capillaries, it is necessary that the different capillaries in the fluid separation device differ from one another in respect to at least one separation characteristic, such as their cross-sectional dimensions, wettability, chemical characteristics, electrical characteristics and magnetic characteristics. Except for dimensional differences, these separation characteristics arise from the character of the inner surface of the capillary slit and inner wall of the capillary, which depends on the material(s) used to form these surfaces, any coating(s) on these surfaces or any modification(s) to the material(s) forming these surfaces, such as might be made by mechanical, chemical, physical, radiation or energetic particle means.

Thus, to function as a fluidic separation device based on admittance/exclusion, at least one of the capillaries in the separation device must possess at least one characteristic necessary to separate at least one of the fluids in the incident fluid stream or mixture from the others. That is, the device must possess at least one capillary that allows the entrance of at least one of the fluids in the stream or mixture and at the same time excluding at least one other component in the fluid stream or mixture. In addition, all the capillaries in the separation device that are able to admit a certain fluid should terminate at a precise position on the exit surface of the separation device, such that the effluent of all these capillaries is in common. This effluent can then be collected or can enter another separation device for further processing.

The example embodiments described in the Separation Devices patent application Ser. No. 10/340,381, issued on Jan. 3, 2006 as U.S. Pat. No. 6,982,787, are a clear advance over the prior art. Yet, further improvements over the prior art are possible and desirable. For, example it is desirable to increase the rate of adsorption of a single species, the rate of separation of at least two immiscible fluids as well as to increase the capacity of these processes.

It is, therefore, an object of the present invention to build on the teachings of the Separation Devices patent application to provide better and more efficient fluid separation, enhanced fluid capacity, increased rate of separation and other functions.

It is a feature of the present invention that it will find valuable use for separating immiscible liquids such as fat, oils and water from one another.

It is another feature of the present invention that it will find valuable use for the removal of gaseous species from liquids, such as removing oxygen from jet fuel to increase turbine engine temperatures and efficiencies.

It is a further feature of the present invention that it will find valuable use for "Dry Feel" fabrics.

It is an advantage of the present invention that its ability to separate immiscible liquids will find valuable use for soaking up spills generally, and particularly for such important uses as cleaning up oil spills at sea.

It is another advantage of the present invention that it will improve hygiene adsorbents such as are used in diapers and tampons.

These and other objects, features and advantages of the present invention will become apparent as the description of certain representative embodiments proceeds.

SUMMARY OF THE INVENTION

The present invention provides new fluid separation devices and high efficiency absorptive and adsorptive materials. The unique discovery of the present invention is that making an axial capillary slit through the side of a non-porous hollow fiber to act as a capillary into the fiber greatly increases the efficiency and usefulness of such hollow fibers over such fibers having capillary entrances in only the ends of the fibers. Specifically, the rate of fluid movement through the axial capillary slit and the total fluid capacity of the hollow fiber are greatly increased.

The present invention solves the problems with the prior art by decoupling the interior fiber volume from the size of the capillary entrance. That is, by employing capillaries formed by overlapping lobes instead of the ends of fiber lobes, it is possible to form a true hollow fiber with greatly increased capacity, increased rate of adsorption or separation, with increased selectivity, and that is more insensitive to pressure fluctuations.

Accordingly, the present invention is directed toward the use of hollow fibers with at least one axial capillary slit in a variety of applications. For example, if the interior wall surfaces of the at least one axial slit-shaped capillary, the wall surface of the at least one internal fiber compartment as well as the at least one exterior surface of the hollow fiber each have a surface characteristic selected from the group consisting of hydrophilic, oleophilic, hydrophobic and oleophobic, or a combination of these characteristics, these fibers can be used as selective absorption materials to absorb fluids or to separate fluids from one another.

For adsorption and separation, these hollow fibers with an axial capillary slit can be used as individual fibers or they can be joined together by techniques such as, weaving, matting, braiding, knitting, felting, and filament winding. Alternatively, the end(s) of the fibers can be manifolded together in a fluid separation device so that the total amount of fluid absorbed or separated from a mixture will not be limited by the volume of the fibers.

When these hollow fibers with an axial capillary slit are manifolded together, they can also be utilized in the reverse sense to produce highly efficient fluid injectors, static mixers, pressure regulators, and micro-reactors. In these applications a fluid is ejected from the manifolded hollow fibers through the capillary slit to a fluid stream that intimately surrounds these fibers.

DESCRIPTION OF THE DRAWINGS

The present invention will be more clearly understood from a reading of the following detailed description in conjunction with the accompanying drawings.

DETAILED DESCRIPTION

The minimum open dimension of a capillary is what controls entrance into the capillary. As this dimension decreases, the force drawing wetting fluids into a capillary increases while the amount of pressure needed to force a non-wetting fluid into the capillary also increases. With fluid only able to enter the end of a capillary, efficiencies and flow rates are low. As described in the present description, efficiencies of fluid separation devices based on capillary effects or wettability effects can be increased by orders of magnitude over those described in the Separation Devices application by providing at least one continuous slit that functions in the same manner as a capillary along the whole axial length of a non-porous hollow fiber. The amount of increase can be easily calculated. The increase in efficiency is proportional to the increase in total capillary entrance area, which will increase proportionally to ratio $A=L/D$ of a hollow fiber with an axial capillary slit aspect, where L is the length of the fiber and D is the cross-sectional size of the capillary.

For a practical fluid separation device with $L=100$ mm and $D=0.01$ mm, the amount of increase of efficiency of the separation device can be 10,000 times. Not only is there an increase of efficiency over hollow fibers, but there is an increase in capacity and filling rate as well. This is due to the fact that with hollow fibers both capacity and rate are determined by the diameter of the fiber. Therefore it is necessary to increase the hollow fiber diameter in order to increase both the capacity and the filling rate. However, an increase in fiber diameter ultimately destroys the capillary action. This is also true for multi-lobal fibers in the prior art. The instant invention solves this problem by de-coupling the fiber from the capillary action by employing an axial slit capillary.

There are basically four types of cross-sections of hollow fibers possessing at least one continuous axial slit-shaped capillary along a substantial section of the fiber's length that provides an entrance from the fiber exterior to at least one internal fiber compartment. The cross-sections can be formed by a gap in the fiber wall, as well as by opposing overlapping, parallel, converging, or diverging capillary walls. The width of each capillary is proportional to the degree of the overlapping of the opposing walls and is substantially greater than the separation distance between the opposing walls of the capillary. That is, the width of the slit-shaped capillary is at least one to ten times, and preferably one hundred times greater than the separation distance between the opposing walls of said capillary. The minimum separation distance between the opposing walls of the capillary slits formed by these techniques ranges from 0.01 to 200 microns and preferably between 0.1 and 100 microns.

Figure 1A:
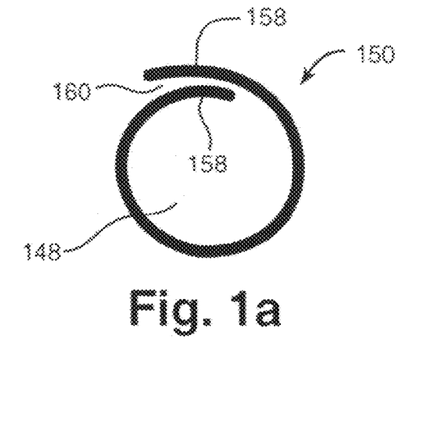
FIG. 1a is a cross-sectional view of a first example embodiment of a hollow fiber with an axial capillary slit according to the teachings of the present invention using overlapping lobes to form a continuous axial capillary slit.
Figure 1B:
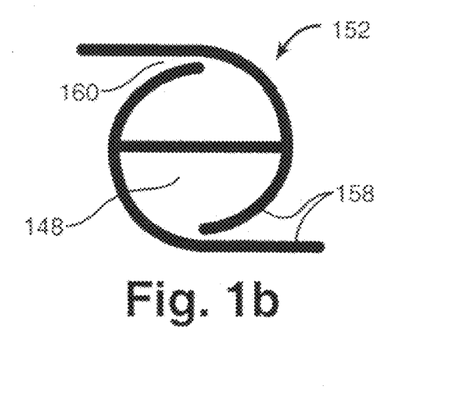
FIG. 1b is a cross-sectional view of a second example embodiment of a hollow fiber with an axial capillary slit according to the teachings of the present invention using overlapping lobes to form a continuous axial capillary slit.
Figure 1C:
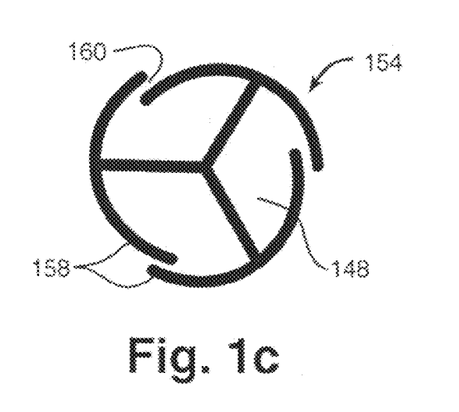
FIG. 1c is a cross-sectional view of a third example hollow fiber with an axial capillary slit embodiment of the present invention using overlapping lobes to form a continuous axial capillary slit.
Figure 1D:
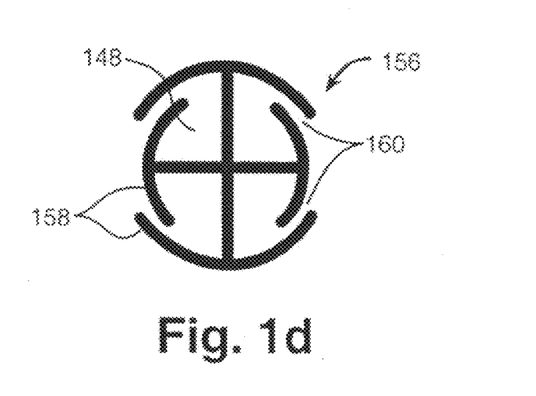
FIG. 1d is a cross-sectional view of a fourth example embodiment of a hollow fiber with an axial capillary slit according to the teachings of the present invention using axial lobes to form a continuous capillary slit.
Figure 1E:
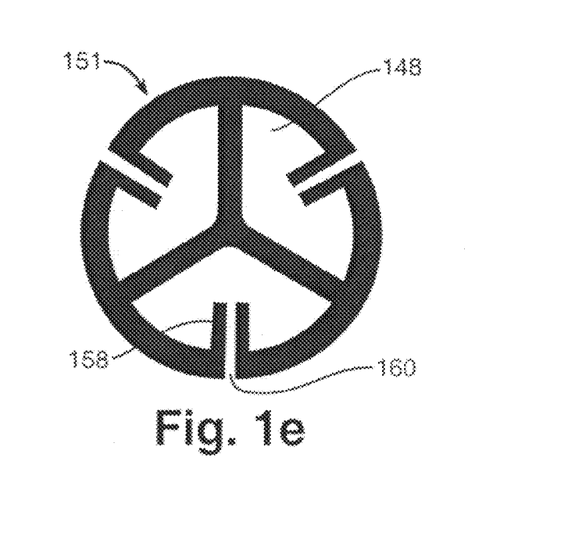
FIG. 1e. is a cross-sectional view of a fifth example embodiment of a hollow fiber with an axial capillary slit according to the teachings of the present invention using inward facing axial lobes to form a continuous capillary slit.
Figure 2:
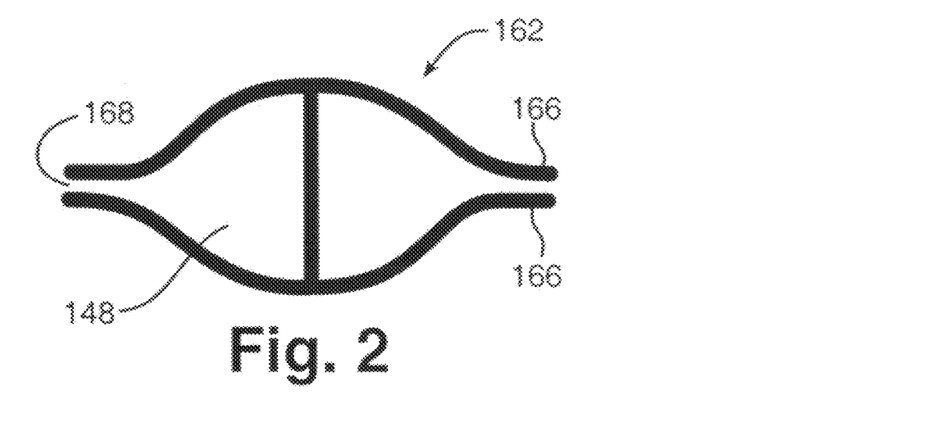
FIG. 2 is a cross-sectional view of a sixth example embodiment of a hollow fiber with an axial capillary slit according to the teachings of the present invention using parallel lobes to form a continuous capillary slit.
Figure 3:
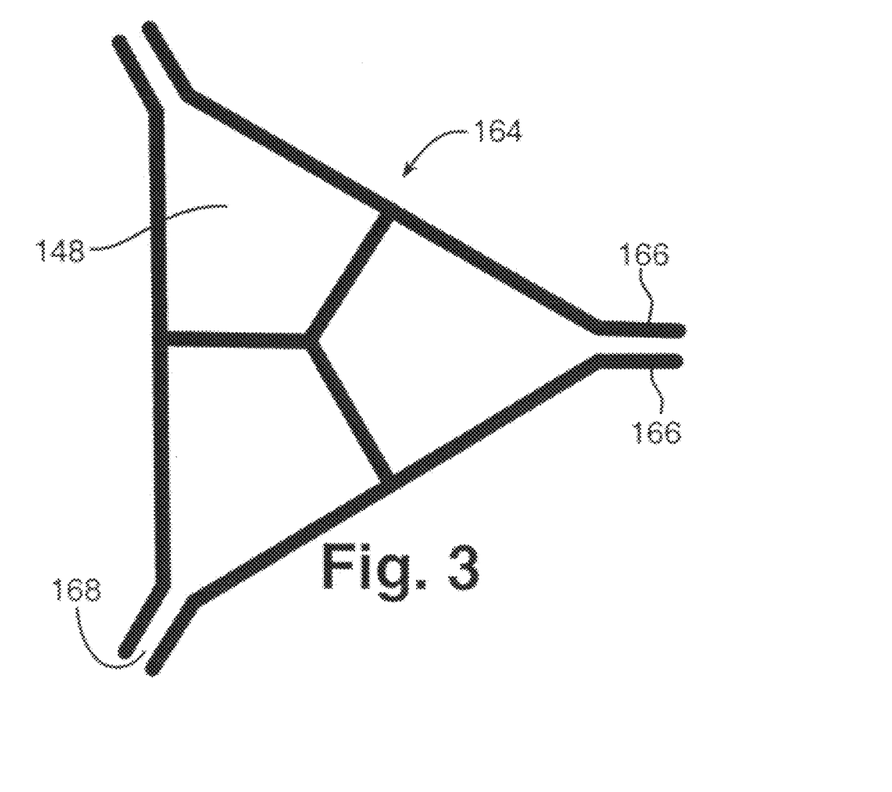
FIG. 3 is a cross-sectional view of a seventh example embodiment of a hollow fiber with an axial capillary slit according to the teachings of the present invention using parallel lobes to form an outward facing continuous capillary slit.

Fiber cross-sections 150, 152, 154, 156 and 151 shown in FIGS. 1 a-d are some possible cross-sections based on overlapping lobes 158 forming a continuous axial capillary slit 160 whose width is equal the extent of overlap of the opposing overlapping lobes. These overlapping lobes can form a capillary slit whose opposing walls are parallel, converging or diverging. Fiber cross-sections 162 and 164 shown in FIGS. 2 and 3 are two examples of fiber cross-sections based on parallel lobes 166 forming a continuous capillary slit 168. FIGS. 1-3 show some representative cross-sections shapes, but there are numerous other possibilities. It can be seen in each figure that the interior surface of each opposing wall of the capillary is formed from either an interior or exterior surface of the hollow fiber. Hence, the interior surfaces of the opposing walls of the capillary can be formed from two interior fiber surfaces, two exterior fiber surfaces, or one interior fiber surface and one exterior fiber surface.

Figure 4:
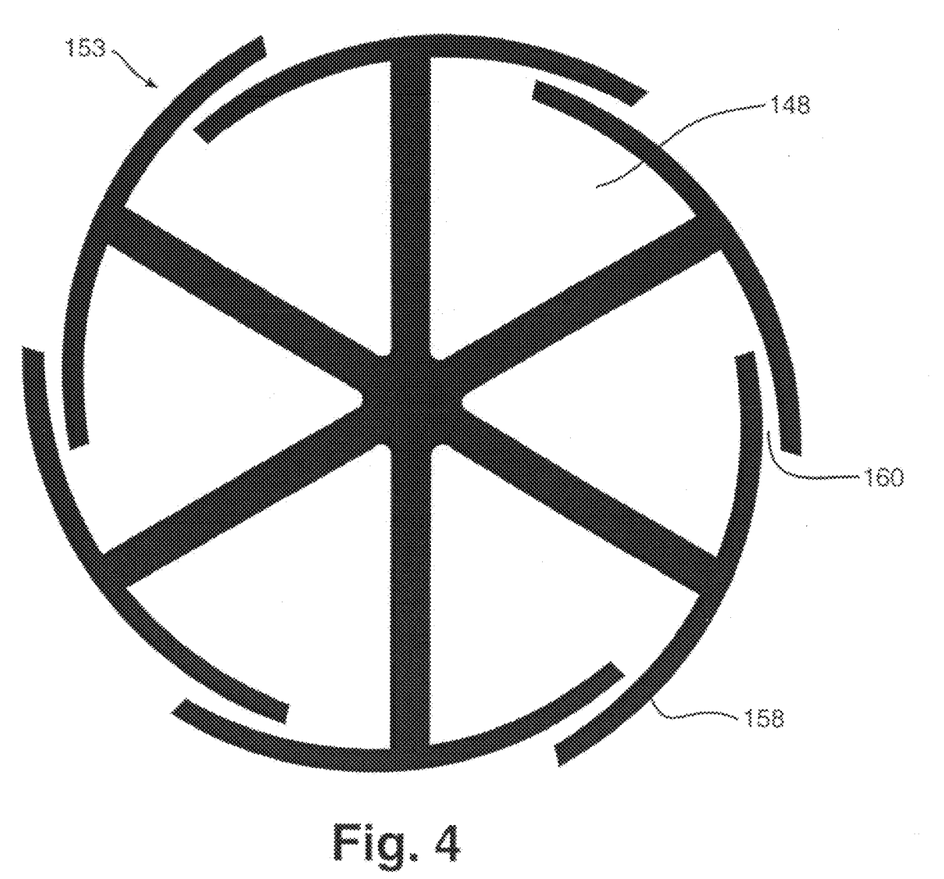
FIG. 4 is a cross-sectional view of a eighth example embodiment of a hollow fiber with six axial capillary slits according to the teachings of the present invention using parallel lobes to form a continuous capillary slit.

The majority of the hollow fiber cross-sections seen in these figures have more than one axial capillary slit, each of which is contiguous with a separate discrete compartment 148 in the hollow fiber. It should be note that if the fiber 153 diameter is larger, additional capillary slits 160 can be added to increase the rate of ingress of fluid into the fiber or the rate of egress out of the fiber. (FIG. 4). Also, the ratio of the minimum capillary slit dimension to the fiber diameter can be varied over a wide range. That is, the maximum cross-sectional dimension of the hollow fiber is at least ten times, preferably at least one hundred times, and most preferably at least one thousand times greater than the separation distance between the opposing walls of said capillary.

Thus, it is possible to fabricate fibers with a much greater absorptive capacity than is possible with current absorbent fibers in which the absorption is on the exterior surface. Additionally, if there is more than one capillary slit in a fiber, the interior surface of the capillary slit and the interior surface of the fiber contiguous with that capillary slit can have a characteristic different from that for the other capillary slits in the fiber, thus allowing several different separations, absorptions or adsorptions in the same fiber.

Thus, the present invention solves the problems with the prior art by decoupling the interior fiber volume from the size of the capillary entrance by utilizing overlapping lobes. Decoupling is important because in the prior art, "the capillary" is determined by the size of the fiber itself. Increasing the internal fiber capacity and ingress rate into the fiber ultimately destroys the "capillary". The advantage of overlapping lobes is that they form two planes that provide a significant distance that the liquid must traverse to enter the fiber interior. As a result, in contrast to the prior art which utilizes the edges of fibers or fiber lobes with insignificant distance for the liquid to traverse as a passage to the interior, the instant invention offers more resistance to pressure fluctuations that would tend to breach the barrier and push the undesired liquid into the fiber. Thus, by employing capillaries formed by overlapping lobes instead of the ends of fiber lobes, it is possible to form a true hollow fiber with greatly enhanced rate and capacity of absorption or separation, with increased selectivity, and that is more insensitive to pressure fluctuations.

Figure 5A:
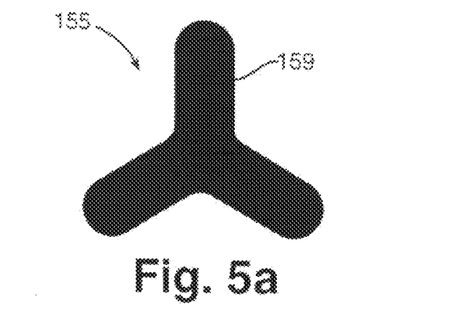
FIG. 5a is a trilobal fiber from the prior art.
Figure 5B:
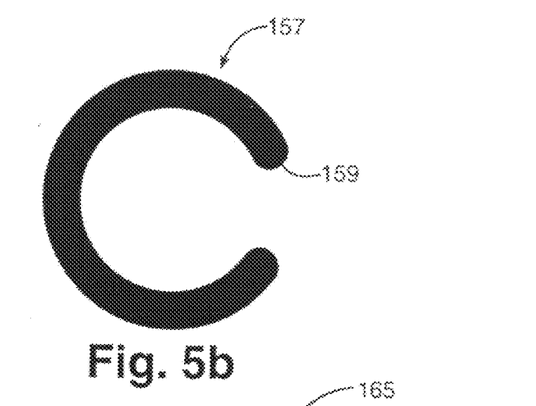
FIG. 5b is a "C" shaped fiber from the prior art.
Figure 6A:
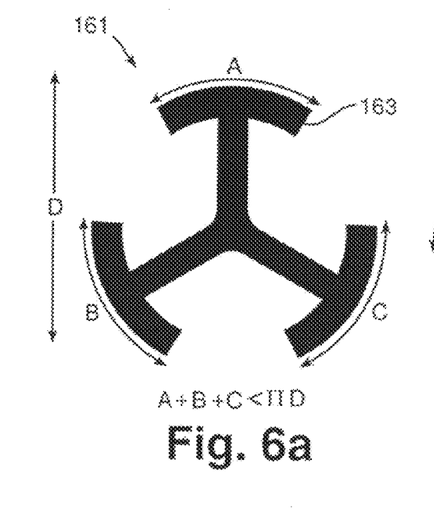
FIG. 6a is a trilobal fiber from the prior art with the total circumference of the lobes being $<\pi D$.
Figure 6B:
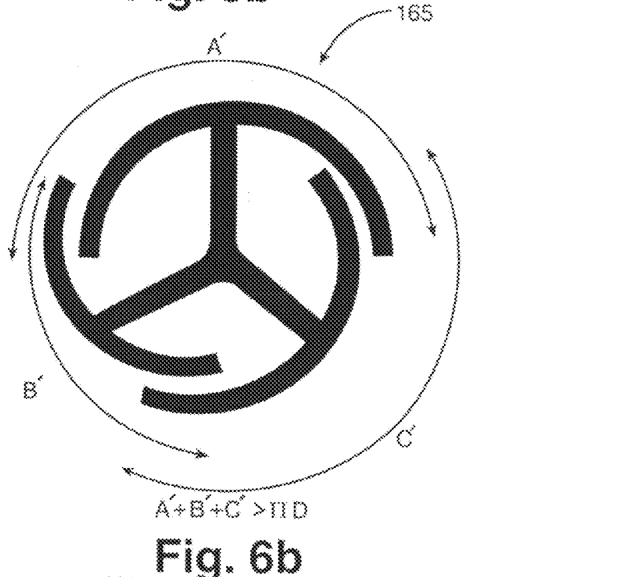
FIG. 6b is a cross-sectional view of a ninth example embodiment of a hollow fiber with an axial capillary slit according to the teachings of the present invention using parallel lobes to form an outward facing continuous capillary slit. Circumference is >πD.

Another difference between the prior art and the instant invention can easily be seen by looking at FIGS. 5 and 6 in which a representatives of the prior art are seen in FIGS. 5*a*, 5*b* and 6*a*. Although there are potential differences in capillary forces among the different fiber cross-sections in FIGS. 5*a*, 5*b* and 6*a*, all of the prior art has a feature in common. That is, on a circular fiber, the circumference of the fiber is always less than $\pi D$ i.e. $(A+B+C<\pi D)$. In contrast, with the instant invention, the circumference of the circular fibers with concentric walls (FIGS. 1 and 3) is always greater than $\pi D$ $((A'+B'+C'>\pi D)$ due to the overlap of the capillary slit lobes (FIG. 6*b*).

It can be seen that with the prior art, the entrance to the cavity is formed by either the sides or the edges of the fiber lobes 159 (FIG. 5) or by the edges of the fiber lobe circumferential extensions 163 (FIG. 6*a*). To increase capillary action into the cavity, either the lobes must be brought closer together or additional lobes added. However, bringing the lobes closer together or adding additional lobes is not desirable since internal capacity is decreased. As a consequence of the coupling of the capillary pressure to the fiber architecture, it is not possible to increase fiber capacity without decreasing capillary forces. In addition, none of these prior art fiber cross-sections is able to separate one liquid from another as the instant invention is able to do.

In the prior art of Rohrbach et al. (U.S. Pat. No. 6,379,564) the edges of the lobe extensions 163 (FIG. 6*a*) did not serve to define a capillary but rather they simply functioned as a conduit between the external fiber surface and the interior fiber cavity. In this invention it was the cavity which functioned as a capillary holding in a liquid. Although it was not the intent of Rohrbach et al. to use the slot formed by the lobe extensions as a capillary, it can be shown that this fiber design is not as effective in separating liquids or resisting pressure fluctuations as the current invention. That is, even if one lengthens the lobe circumferential extensions until a capillary is formed, this cross-section still has limitations because the width of the capillary which controls separation and pressure fluctuation is defined by the thickness of the fiber lobe circumferential extensions. Consequently, there is a trade-off between the rigidity of the fiber on the one hand and both the cavity capacity and the capillary width on the other hand. In contrast to the instant invention which has excellent liquid separation characteristics and resistance to pressure fluctuations because the ratio of capillary width to minimum capillary dimension is at least one to ten times, and preferably one hundred times, using the prior art fiber cross-section it can be seen that the ratio is less than one.

The instant invention, has none of the limitations of the prior art in the areas of response to a particular liquid, insensitivity to pressure fluctuations, fiber capacity for a fluid or rate of fluid entrance into the internal portions of the fiber. That is, because the instant invention decouples the capillary entrance dimensions from the fiber dimensions, there is not a trade-off between capillary pressure and capacity. Parameters can be more effectively controlled since width (degree of lobe overlap)/diameter (separation distance between lobes) of the capillary can be accurately controlled and can range from 1 to preferably 10, and more preferable to 100.

Hollow fibers with at least one capillary running along their length have two broad areas of application. Used as discrete fibers as shown in FIGS. 1-3, or in woven, braided, knitted, felted, filament wound or matted form, these fibers can be used as very efficient particle filtration, absorptive materials, adsorptive materials, time-release or separation devices. When used for particle filtration, the capillary slits are nearly impossible to clog with particulates that are generally essentially spherical in shape. In addition, this type of particulate filter is easy to clean by simply pressurizing the interior of the fibers and back-flushing the fiber. When used as a time-release device, the material that has been previously placed inside the hollow fiber is accessible along the entire length of the fiber simultaneously making this a relatively fast-release device. This is in contrast to conventional hollow fibers in which the material on the inside of the fiber is accessible only through the ends and release is controlled by diffusion. When one or both ends of the hollow fibers with an axial capillary slit are connected to a manifold as described below, a separation device with essentially infinite capacity results. For gas or liquid injection, these devices are ideal because the fibers can be in intimate contact with the second fluid along the entire length of the fiber.

One of the functions of the hollow fibers in the instant invention is to admit only a portion of the fluids present around the fibers and exclude the rest on the basis of the surface characteristics of the capillary slit entrance. Accordingly, it is the fiber itself and not something inside the fiber that separates the fluids around it. The purpose of the at least one compartment in the fiber (148) is to act as a holding tank for any liquid separated out of the surrounding medium. Therefore any material initially in the fiber compartment will decrease the capacity of the compartment and the efficiency of the fiber.

To function as an absorptive material or separation device the interior surface of the capillary slit and the interior surface of the corresponding hollow fiber compartment must be contiguous and possess the same surface characteristic, such as hydrophilic, oleophilic, hydrophobic and oleophobic. Hydrophilicity and/or oleophilicity are required for an absorptive material while hydrophilicity, oleophilicity, hydrophobicity, or oleophobicity may be required for separation of a particular fluid from a fluid stream. It is usually preferable for the entire fiber to be fabricated from or coated with the same material. Thus, for example, if the interior surface of the fiber capillary slit and the interior of the contiguous hollow fiber compartment, as well as preferably the entire fiber surface are hydrophilic, water or water-based fluids will be drawn into the interior of the hollow fiber by capillary action through a process that involves both adsorption as well as absorption.

It should be noted, however, that if the exterior surface of the hollow fiber is not the same material as the interior surfaces of the capillary slit and the fiber, the behavior of the hollow fibers with an axial capillary slit will change. That is, if, for example, the interior surfaces are hydrophilic while the exterior surface is hydrophobic, water-based liquid will not enter the capillary slit until the appropriate pressure is reached if the walls of the capillary slit are parallel or diverging. If the walls of the capillary slit are converging water will spontaneously go into the capillary slit.

Since these adsorption and absorption processes occurs along the entire length of the fiber and not just through the ends as in the prior art, this process is many orders of magnitude more rapid and more efficient. The surface of the fiber can be made hydrophilic, for example, by utilizing a hydrophilic material to fabricate the hollow fiber, by coating the fiber with hydrophilic material or by treating the surface of the fiber chemically, physically, with a plasma or corona, or with radiation to render the surface hydrophilic. Applications of this type of hydrophilic adsorbent are numerous and include medical dressings, personal hygiene articles such as diapers and tampons, "super adsorbent" textiles for fluid wipe-up, and "dry feel" textiles, which adsorb perspiration while feeling dry to the skin. The force drawing liquid into these capillary slits will increase as the minimum dimension of the capillary slit decreases. For most applications, the hydrophilic hollow fibers will be made from a hydrophilic polymer such as Nylon. However, for higher temperature applications or for applications that require mechanical strength or rigidity, metals or ceramic materials can also be utilized. These hollow fibers with an axial capillary slit can be made from a mixture of ceramic, metal, or alloy particles in a carrier or binder using an extrusion process similar to that used for polymer extrusion. If carbon is the desired material for a particular hollow fiber with an axial capillary slit application, these can easily be made by carbonizing a polymer fiber, such as polyimide or polyacrylonitrile (PAN). Glass or quartz hollow fibers with an axial capillary slit, which have application in high temperature as well as corrosive environments, can be easily spun by commercial processes used to produce fiberglass and optical fibers.

In a like manner, if all the surfaces of the fiber are oleophilic, hydrocarbons will be very efficiently drawn into the interior of the hollow fiber. If it is desired to remove a hydrocarbon material such as oil or fuel from water, the surface of the fiber can be rendered oleophilic and hydrophobic by any number of techniques, such as those described in U.S. Pat. Nos. 5,744,406 to Novak, 5,127,325 to Fadner and 4,101,346 to Dorsey, Jr. Thus, the hollow fibers with an axial capillary slit described herein can be used individually, or they can be woven or braided to adsorb fuels, oils or fats. The hydrocarbons will enter the capillary under capillary pressure and be retained while water-based fluids will be excluded. A broad range of applications cover the gamut from cleaning up oil spills on water to removing fats and oils during food preparation.

Conversely, if it is desired to have a water-based fluid and not a hydrocarbon adsorbed by the hollow fiber, the surface of the fiber would be rendered hydrophilic and oleophobic by a process such as described in U.S. Pat. No. 5,385,175 to Rivero et al. It is possible to regenerate, i.e., empty, these hollow tubes for re-use employing techniques such as evaporation, solvation and reverse pressurization. Of course, during the same procedure the contents of the hollow tubes that have entered the fiber under capillary forces can be reclaimed and recovered if desired.

Hollow fibers with an axial capillary slit with the cross-sections described in FIGS. 1-4 have adsorbed (and separated) on the basis of the wettability of the surface and the minimum dimension of the capillary slit. The wettability criteria in the examples described previously is whether the contact angle of the liquid with the surface of the capillary slit and fiber material is above or below 90°. That is, if the contact angle is below 90°, the liquid will enter the capillary slit because of capillary force with the capillary force increasing as the contact angle decreases. On the contrary, if the contact angle of the liquid in question with the fiber surface is greater than 90°, the liquid will not spontaneously enter the capillary unless a pressure greater than that calculated from Equation (2) is applied.

It should be noted that, within limits, the rate of fluid admittance can be controlled by varying the minimum separation distance between opposing walls of the capillary slit along the fiber. For example, with a non-wetting fluid involved, as long as the minimum dimension of the capillary slit is not large enough to be overcome by the applied pressure as described in Equation (2), the rate of a second fluid entering the fiber can be varied by changing the minimum separation distance between opposing walls without admitting the non-wetting fluid.

The minimum separation distance between opposing walls of the capillary slit in the fiber can in turn be controlled by a proper choice of manufacturing conditions or in post-processing. There are many possibilities in post-processing for control of the capillary slit minimum separation distance between opposing walls. For example, the hollow fibers with an axial capillary slit could originally be manufactured with a relatively large minimum separation distance between opposing walls, which is subsequently narrowed by processes such as coating, oxidation, or pyrolysis. Thus, a hollow fiber with an axial capillary slit can be coated with either the same material from which it was manufactured or by a different material. This can occur along the entire length of a particular hollow fiber with an axial capillary slit or along only a portion of the fiber. Using a coating process, the minimum separation distance between opposing walls of the capillary slit can vary in a stepwise manner, in a graded manner or a combination of the two. Alternatively, if the hollow fibers with an axial capillary slit are made from a pre-ceramic polymer or are manufactured from ceramic, metal, or alloy particles in a carrier or binder by an extrusion process, for example, the minimum separation distance between opposing walls of the capillary slit can be controlled by the degree of sintering as well as the percentage of binder that is in the mixture and removed during processing. In the case of a polyimide tube, shrinkage of up to 22% can occur during its conversion to carbon at elevated temperatures in an inert environment.

Figures 7A, 7B:
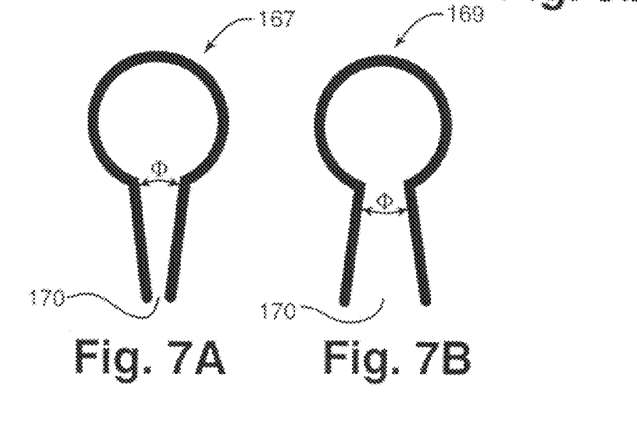
FIG. 7a is a cross-sectional view of a tenth example embodiment of a hollow fiber with an axial capillary slit according to the teachings of the present invention using diverging lobes to form a continuous capillary slit.
FIG. 7b is a cross-sectional view of an eleventh example embodiment of a hollow fiber with an axial capillary slit according to the teachings of the present invention using converging lobes to form a continuous capillary slit.

It is also possible to allow entrance of one liquid that forms a contact angle of less than 90° with the surface of capillary slit into the capillary slit in the hollow fiber and not allow another liquid with a different contact angle of less than 90° into the capillary slit. This is accomplished by utilizing a hollow fiber with a tapered diverging capillary slit 167 and controlling the included angle $\phi$ at the entrance to a slit capillary 170 as seen in FIG. 7a.

In addition to employing capillaries to separate a fluid stream on the basis of wettability alone, it is possible to utilize capillaries to separate a fluid stream or mixture on the basis of the individual fluid wettability in combination with the axial or cross-sectional shape of the capillary. This is based on a relationship between the intrinsic contact angle of a fluid with a surface and the included angle φ formed by that surface. For each liquid/capillary surface pair, there is a transitional included angle that determines whether the liquid will go into a capillary with angular features.

For a wetting fluid (θ<90°, the transitional included angle is:

$$\phi_{tw}=180°-2\theta \tag{3}$$

Thus, for a wetting liquid, although it wets the surface, without an applied pressure it will not spontaneously flow into the small end of a capillary that has an included angle φ greater than 180°−2θ.

It is possible to employ these relationships for the transitional included angle to separate a fluid stream or mixture on the basis of the geometric shape of a capillary. The requirements of such a device for successful separation are that there be a small included section, the contact angles of the liquid with the surface differ significantly and that the droplet size in the mixture be at least the same magnitude as the capillary dimensions. It should be noted that this technology cannot be used to separate miscible fluids.

In addition to exclusion based on an included angle, the fiber 167 of FIG. 7a can be used in the reverse mode as a pressure or flow regulator if the walls in the tapered region are flexible. That is, the pressure of a fluid inside of the fiber or the flow of fluid out of the fiber can be controlled by the proper choice of minimum capillary slit dimension and stiffness of the walls in the tapered region. Thus, as the pressure increases inside the fiber, the walls in the tapered region will separate to increase flow and decrease pressure. It should be noted that any hollow fiber with an axial capillary slit but particularly those in FIGS. 2, 3 and 7, could also function in this manner.

In addition to being able to separate two liquids that wet the fiber surface on the basis of the included angle of the diverging capillary slit, it is also possible to separate two liquids that do not wet the surface of the capillary slit (θ>90° utilizing a converging slit. In this case shown in FIG. 7b, a liquid that does not wet the exterior or capillary slit surface will enter the capillary slit and into the fiber if the liquid wets the fiber interior and if the included angle of the capillary slit, φtnw, is greater than the transitional angle. The transitional included angle for a liquid that does not wet the surface of the fiber is determined by equation 4.

$$\phi_{tnw}=2\theta-180° \tag{4}$$

In addition to being able to separate two liquid that do not wet the capillary slit on the basis of the included angle of the capillary slit, it is also possible to separate them on the basis of pressure. That is, if the entrance pressure of the two liquids as determined by equation 2 is significantly different, they can be separated on the basis of pressure, however this is not a particularly elegant technique.

Figure 8:
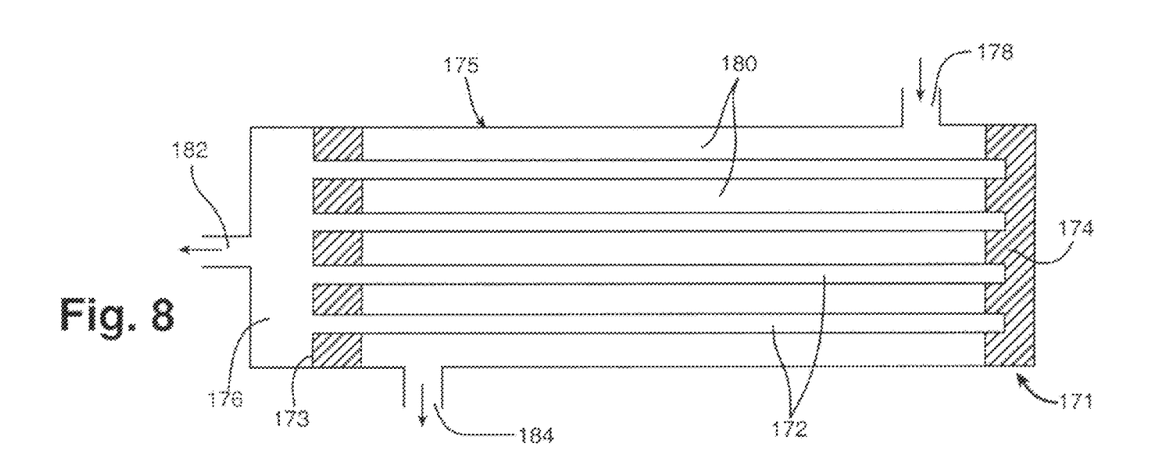
FIG. 8 is a schematic view of a first example embodiment of a separation device using hollow fibers with an axial capillary slit according to the teachings of the present invention.

It has been demonstrated that individual hollow fibers with an axial capillary slit can be employed in absorption, adsorption as well as separation. However, as single fibers the amount that can be absorbed or separated is limited by the volume of the interior of the hollow fiber. If these fibers are properly manifolded, the amount of fluid that is separated can be greatly increased. The device 171 in FIG. 8 is a simple separation unit that can be used to separate one fluid from another. It can separate one fluid component (gas or liquid) out of a fluid stream entering the device 171. Hollow fibers with an axial capillary slit 172 are mounted on their ends in end plates 173 and 174. The fibers are mounted in an end plate 174 in such a manner that they are not only held in place but also the ends of the fibers are sealed closed. The opposite end of the fiber(s) is (are) sealed in the end plate 173 with a fluid-tight seal in such a manner that the fiber ends are not closed but terminate at or past the outer edge of the endplate so that the interior of the fiber(s) communicates with a chamber 176.

In this particular example embodiment, a fluid stream containing a gas dissolved in a liquid enters the container inlet port 178 and fills the volume 180 in the container between and around the fibers. This volume is bounded by the endplate 173, endplate 174, and the wall of the container 175. The fibers are preferably close enough to touch one another, but are shown separated in the figures for the sake of clarity. By means of the inner geometry of the device and the packing density of the fibers, the fluid is forced to be in intimate contact with the fibers 172 along their entire length. The diffusional path to the fiber capillary slits is thus short to enhance removal. Because the liquid in this embodiment has a contact angle of >90° with the fiber surface, it will be excluded from the fiber. To assist the diffusion of the gas out of the liquid and into the hollow fibers with an axial capillary slit, a differential pressure can be maintained between the fluid surrounding the fibers and the interior of the fibers. This can be accomplished by pressurizing the fluid or by pulling a vacuum on chamber port 182 by a pumping device that is not shown. Obviously, the pressure differential must be kept less than that required to force the non-wetting liquid into the capillary slit. Due to the lower pressure inside the hollow fibers, gas dissolved in the liquid enters the capillary slit and is removed through chamber port 182. The liquid is not able to enter the capillary slit in the fibers due to lack of wettability and proceeds to exit fluid outlet port 184. If desired, a portion or all of the liquid that exits outlet port 184 can be recycled by bringing it into the device again through inlet port 178. To remove a gas from a water-based liquid, it is only required that the fiber surface be hydrophobic, having as high a contact angle as possible with the liquid, and that the minimum dimension of the capillary slit be small enough to require a liquid pressure according to Equation (2) for entry into the capillary slit which is higher than the incident liquid pressure. To remove a gas from a hydrocarbon or hydrocarbon mixture, such as, an oil or a fuel, it is necessary for the fiber to have a highly oleophobic surface and that the capillary slit be small enough to exclude the liquid. Since oleophobic materials are not easily spun into fibers, the fiber can be coated after it is fabricated with an oleophobic material, such as ZONYL available from Dupont, 1H, 1H-Pentadecafluoro octyl methacrylate available from Karl Industries Inc., Sapon Laboratories Division, TG-472 available from Daikin America, Inc. or perfluoropropylene. This same device is also able to remove one immiscible liquid from another if one liquid will enter the capillary slit and the other will not. In this case the separation rate would be enhanced if the device was oriented in such a way that port 182 was located at the bottom of the device in order that gravity might be used to assist the separation. It should be noted that this type of separation device could be operated in reverse if the liquid with the dissolved gas was flowed through the hollow tubes and the volume exterior to the fibers was evacuated. Of course, this would require that the liquid not wet the interior of the capillary slit. It should be apparent that, the separation in this configuration would be enhanced if the fibers were sealed with a fluid tight seal to separate chambers and remained open on both ends. In addition it should be noted that this type of device can also be used in reverse in order to saturate liquids with gas or to inject a liquid into a liquid stream. Thus, the separator becomes an injector without any change to the device.

Figure 9:
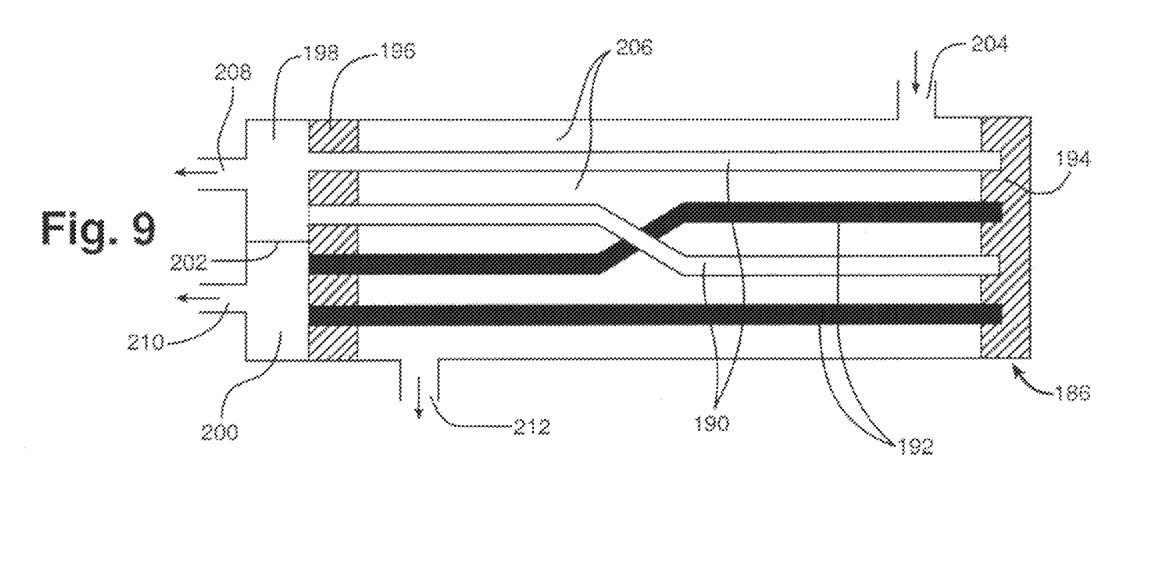
FIG. 9 is a schematic view of a second example embodiment of a separation device using hollow fibers with an axial capillary slit according to the teachings of the present invention.

A further improvement on the separation device in FIG. 8 is the separation device in FIG. 9. The construction is similar to that in FIG. 8 with the exception that there are two types of fibers 190 and 192 with different capillary slit and interior surfaces. In addition, although one end of each type of fiber is sealed in endplate 194, the open ends of these two types of fibers are sealed with a fluid-tight seal in endplate 196 and terminate in two different chambers 198 and 200 formed by divider 202. The fibers are preferably close enough to touch one another, but are shown separated in the figures for the sake of clarity. In this device, the fluid stream or mixture to be separated enters the device through inlet port 204 and completely fills the space 206 between the fibers. By means of the inner geometry of the device and the packing density of the fibers, the fluid is forced to be in intimate contact with all the fibers 190 and 192 along their entire length. The surfaces of the two types of fibers are chosen so that only one fluid in the fluid stream that enters the device will enter that particular fiber due to wettability. Fibers 190 are wetted by a first component in the fluid stream and have a contact angle of >90° with all the other components of the fluid stream entering the device. Fibers 192 are wetted by a second component in the fluid stream and have a contact angle of >90° with all the other components of the fluid stream entering the device. Thus, this type of device can be used to separate at least two liquids from a stream or mixture or to separate a gas and at least one liquid from another. In this particular embodiment, a first fluid component of the fluid stream entering inlet port 204 will be able to enter fiber 190. It will then exit the fiber into chamber 198 and exit the device through chamber port 208. Likewise, a second fluid component of the fluid stream entering inlet port 204 will be able to enter fiber 192. It will then exit the fiber into chamber 200 and exit the device through chamber port 210. Any liquid that does not enter the hollow fibers with an axial capillary slit 190 and 192 will exit the device through exit port 212.

Figure 10:
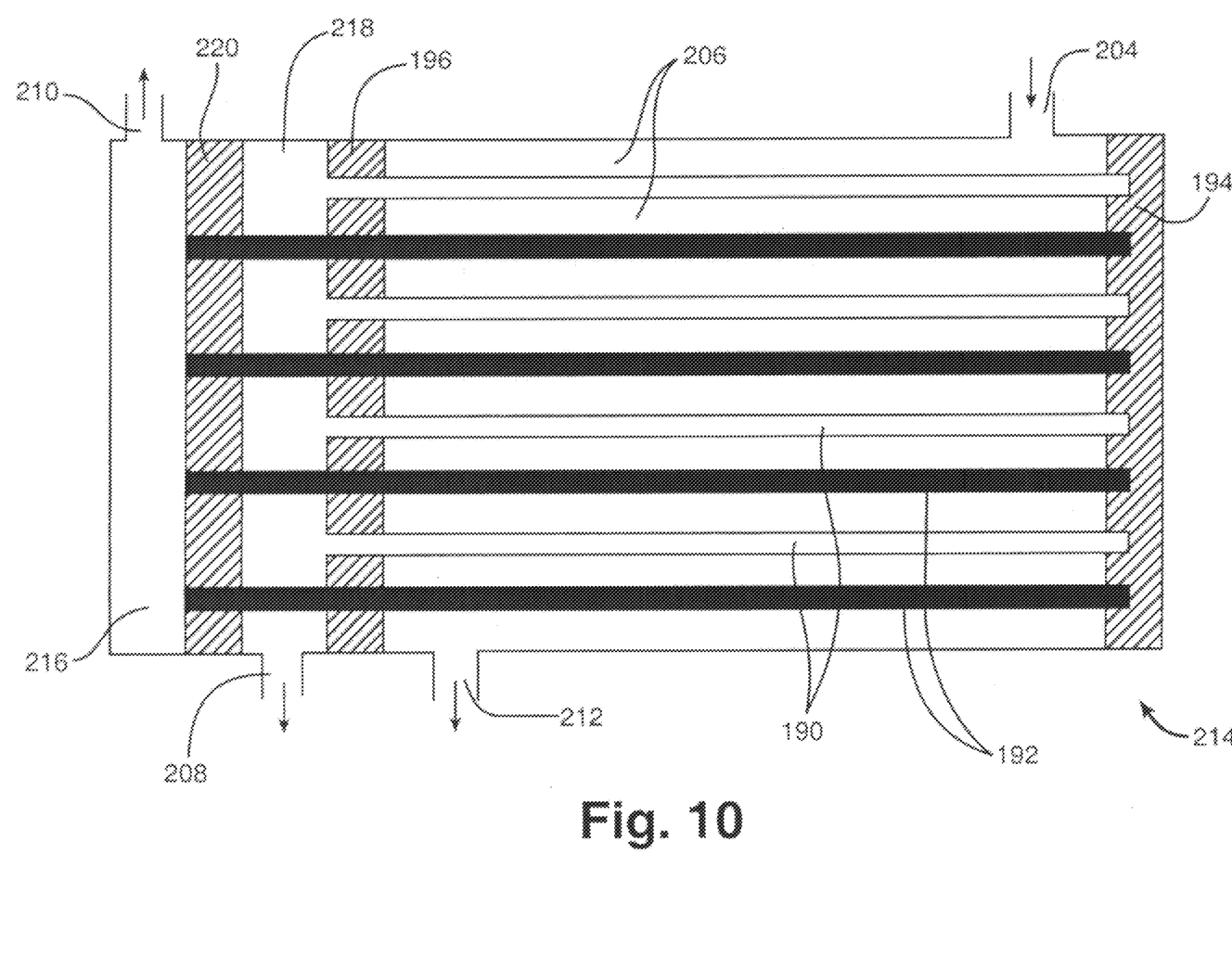
FIG. 10 is a schematic view of a third example embodiment of a separation device using hollow fibers with an axial capillary slit according to the teachings of the present invention.
Figure 11:
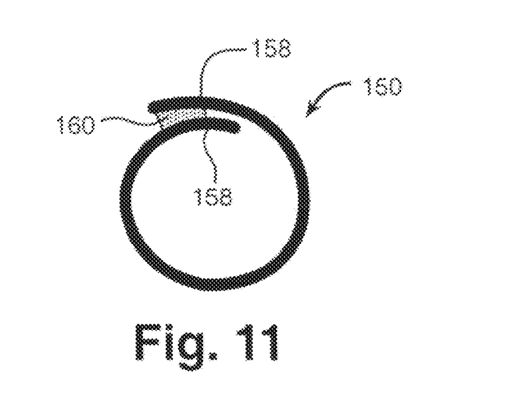
FIG. 11 is a cross-sectional view of a first example illustration of a bi-component fiber spinning method for making hollow fibers with an axial capillary slit according to the teachings of the present invention.
Figure 12:
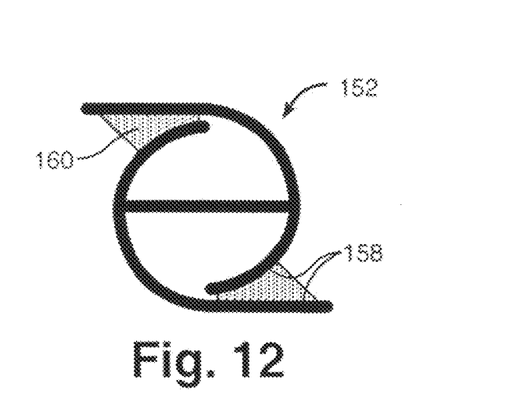
FIG. 12 is a cross-sectional view of a second example illustration of a bi-component fiber spinning method for making hollow fibers with an axial capillary slit according to the teachings of the present invention.
Figure 13:
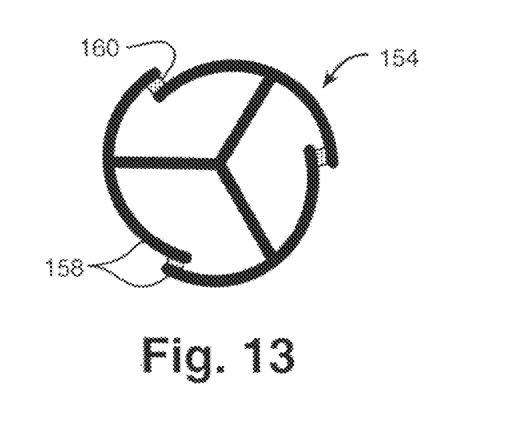
FIG. 13 is a cross-sectional view of a third example illustration of a bi-component fiber spinning method for making hollow fibers with an axial capillary slit according to the teachings of the present invention.
Figure 14:
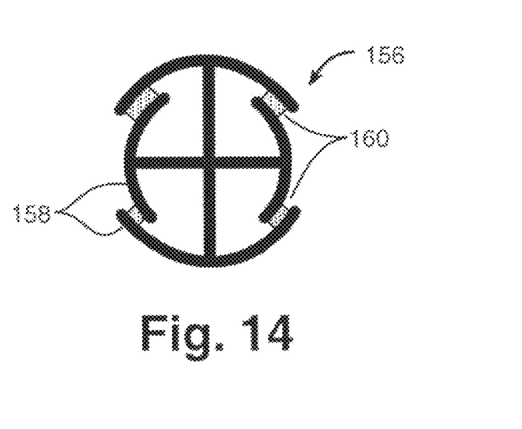
FIG. 14 is a cross-sectional view of a fourth example illustration of a bi-component fiber spinning method for making hollow fibers with an axial capillary slit according to the teachings of the present invention.
Figure 15:
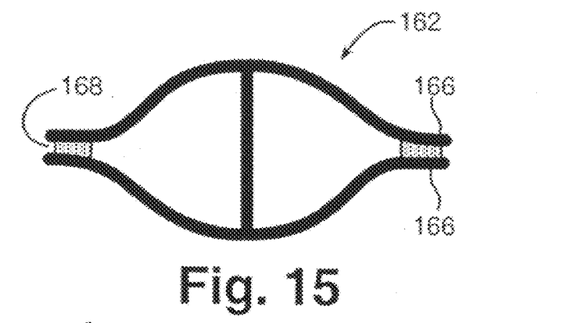
FIG. 15 is a cross-sectional view of a fifth example illustration of a bi-component fiber spinning method for making hollow fibers with an axial capillary slit according to the teachings of the present invention.
Figure 16:
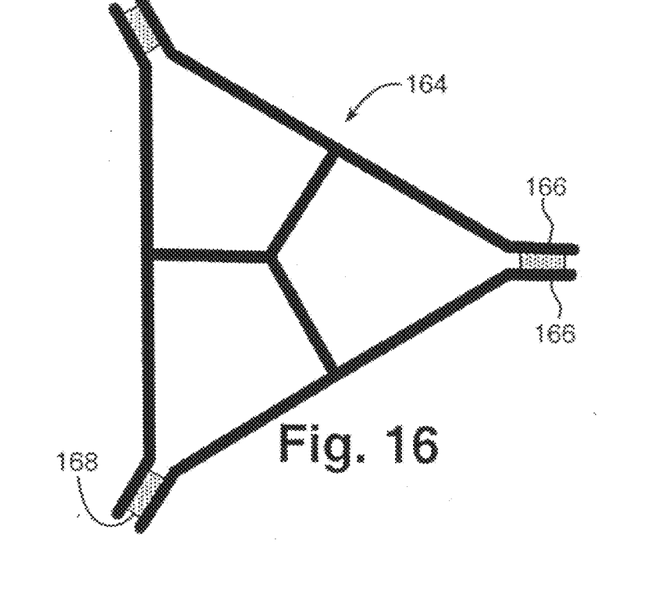
FIG. 16 is a cross-sectional view of a sixth example illustration of a bi-component fiber spinning method for making hollow fibers with an axial capillary slit according to the teachings of the present invention.
Figure 17:
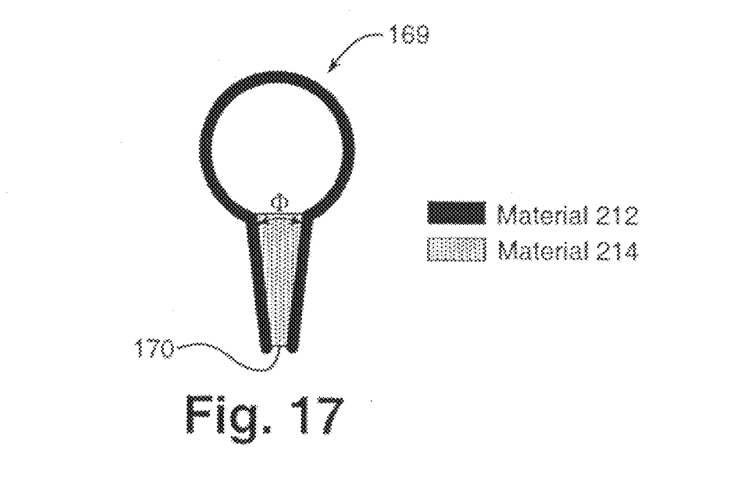
FIG. 17 is a cross-sectional view of a seventh example illustration of a bi-component fiber spinning method for making hollow fibers with an axial capillary slit according to the teachings of the present invention.

FIG. 10 is a slight variation on FIG. 9 to better clarify the technology. In this device 214 the different kinds of fibers 190 and 192 have different lengths and terminate in different vertical chambers 216 and 218 separated by a divider 220 that also serves as the endplate for fibers.

Several additional points can be made about this type of separation device. For example, this device can be employed in reverse to be used as a static fluid mixer, reactor or a gas injection system. It should also be noted that in any separation device utilizing hollow fibers with an axial capillary slit, there is no limit to the number of different types of fibers that can be utilized. In addition, it is possible for a fiber to admit more than one fluid in the incident fluid stream and exclude all others.

When used in the reverse mode, a liquid or a gas can be injected into the incident fluid stream. The purpose may be to dissolve a gas in a liquid, mix at least two liquids or gases intimately together, or form liquid droplets in a gas stream. To enhance a chemical reaction, these injection devices can be employed to inject one reactant intimately into another. Alternatively, the inside of the hollow fibers with an axial capillary slit can act as a micro-reactor for one or more components, which react and are then injected into another fluid stream for possible further reaction. If a heterogeneous catalyst is placed on the inside or outside of the hollow fibers with an axial capillary slit or if the fiber itself is catalytic, the reactant(s) will be forced into intimate contact with the catalytic surface and each other much like reactants in a zeolite. This will further increase the efficiency of the reactor.

Downstream of this reactor a separation device, such as one based on hollow fibers with axial capillaries, can be employed to remove one or more products of the reaction in order to separate and collect the products or to simply shift the equilibrium of a reaction by removal of at least one product in order to bring the reaction toward completion. By reducing the concentration of one component in the mixture undergoing reaction, the overall equilibrium for the particular chemical reaction under consideration will shift toward formation of additional reaction products that have been removed; as a result, a more complete conversion of initial reactants to products is obtained.

In addition, by employing the fibers of the present invention, it is possible to operate gas phase reactions at optimum pressures and still obtain a desirable conversion. Likewise it is possible to operate in temperature ranges of less favorable equilibrium constants at which undesirable side reactions may be repressed or entirely eliminated. In these chemical reactors and separators, hollow fibers with an axial capillary slit have the advantage over porous hollow fibers in that they do not depend simply on diffusion of small molecules through the wall. Porous hollow fibers only allow the transport of small molecules like hydrogen through the wall while hollow fibers with an axial capillary slit allow any reactant or product to move from one side of the hollow fiber to the other.

In the separation devices shown in FIGS. 8-10, both end of the fibers could be manifolded in such a way that the interior of the fibers are in communication with a chamber, such as 176, 198, 200, 216 or 218, on both ends instead of being blocked on one end so that efficiency of removal or injection could be increased.

If one assumes a fiber diameter of 30 microns ad a length of 30 centimeters, the hollow fibers with an axial capillary slit in this invention can easily have 10,000 times the capillary entrance surface area and therefore 10,000 the absorption and separation efficiency as hollow fibers of the prior art. Because of the short distance from the capillary slit to the center of the hollow fiber, the speed of adsorption and absorption is greatly increased. In addition, due to the uniformity of the capillary slits' width and minimum separation distance between the opposing walls, the separation and absorption properties of the fiber are consistently uniform as compared to random media, where the flow path for particles may vary.

The cross-sections of the hollow fibers with an axial capillary slit of this invention can be formed by normal fiber extrusion processes, such as single component spinning, single component spinning with gas injection and bi-component spinning. U.S. Pat. Nos. 4,254,181 to Bromley et al. and 4,325,765 to Yu et al. describe single component spinning of so-called non-round filaments.

Conventional fiber spinning processes require extremely precise control of the viscosity of the material being spun, the pressure forcing this material through the spinnerette, as well as the tension on the resulting fiber strand to form capillary slits of microscopic dimensions in fibers. In particular, forming hollow fibers with an axial capillary slit such as shown in this description require careful and continuous control of polymer feeding and fiber draw rates to achieve a desired final net shape. In order to closely control capillary slit shapes and sizes with less effort, and more easily make long continuous lengths, a bi-component fiber spinning method may have advantages over more conventional spinning methods utilizing a single material. When extruding two different materials together through a spinnerette capillary, a second material can be used to precisely define the size and shape of the capillary slit as seen in FIGS. 11-17. By precisely controlling the flow of the second material through the spinnerette, the capillary slit shapes and dimensions will be controlled with great precision. This material, used to define the size and shape of the capillary slits, is a fugitive or sacrificial material that is later removed by some means such as solvation, vaporization, or oxidation.

In the example embodiments of FIGS. 11-17, a first material 212 is the material from which the hollow fibers with an axial capillary slit is formed. It may be any material that is extrudable, such as a thermoplastic polymer or a glass, as well as a mixture of ceramic, metal, or alloy particles in a carrier or binder. In addition, it can be either hydrophobic (polypropylene, polyethylene Teflon, etc.) or hydrophilic (nylon, polymethylacrilate, metals, alloys, etc.) in nature, depending on the application of the hollow fibers with an axial capillary slit It can be either oleophobic or oleophilic as well as any combination, such as hydrophilic and oleophilic, oleophobic and hydrophilic, hydrophobic and oleophobic or hydrophobic and oleophilic.

Material 214 is a sacrificial material and is chosen based on its ease of complete removal after fiber formation. This removal criterion might be satisfied by its solubility properties, such as polyvinyl alcohol in water, or its ability to completely vaporize without leaving a residue, such as polyalphamethylstyrene.

The capillary slit shapes and dimensions can be controlled with great precision by adjusting the flow of material 214 through spinning heads allowing flow of two separate materials.

After subjecting the bi-component fiber to the thermal, chemical or solvation treatment needed to remove material 214 the fibers assume their final shapes shown in FIGS. 1-7.

The disclosed new separation devices, their component hollow fibers with an axial capillary slit and methods for making such devices and fibers successfully demonstrate the use and value of such hollow fibers with an axial capillary slit. Although the disclosed devices and component materials are specialized, their teachings will find application in other areas where a well-known physical property, such as capillary action, and devices utilizing those properties, can be improved.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

We claim:

1. An absorptive material with an enhanced rate and capacity of absorption comprising at least one hollow fiber having at least one axial slit-shaped capillary along a substantial section of said fiber's length that provides an entrance from the fiber exterior to at least one internal fiber compartment; wherein said at least one slit-shaped axial capillary is formed by opposing overlapping, parallel, converging, or diverging capillary walls; the width of said capillary being proportional to the degree of the overlapping of the opposing walls and substantially greater than the separation distance between the opposing walls of said capillary; the interior surface of each said opposing wall of said capillary formed from either an interior or exterior wall of said hollow fiber; wherein the interior wall surfaces of the at least one axial slit-shaped capillary, the wall surface of the at least one internal fiber compartment as well as the at least one exterior surface of the hollow fiber each having a surface characteristic selected from the group consisting of hydrophilic, oleophilic, hydrophobic and oleophobic.

2. The absorptive material according to claim 1 wherein the interior surface of one opposing wall of said capillary is formed from an interior wall of said hollow fiber and the interior surface of the other opposing wall of said capillary is formed from an exterior wall of said hollow fiber.

3. The absorptive material according to claim 1 wherein the interior surface of both opposing walls of said capillary are formed from interior walls of said hollow fiber.

4. The absorptive material according to claim 1 wherein the interior surface of both opposing walls of said capillary are formed from exterior walls of said hollow fiber.

5. The absorptive material according to claim 1, wherein the width of said slit-shaped capillary is at least one to ten times, and preferably one hundred times greater than the separation distance between the opposing walls of said capillary.

6. The absorptive material according to claim 1, wherein the opposing walls of said at least one axial slit-shaped capillary are separated by a distance of 0.01 to 200 microns.

7. The absorptive material according to claim 1, wherein the maximum cross-sectional dimension of the hollow fiber is at least ten times, preferably at least one hundred times, and most preferably one thousand times greater than the separation distance between the opposing walls of said capillary.

8. The absorptive material according to claim 1, wherein the interior wall surfaces of the at least one axial slit capillary has a fluid separation characteristic resulting from any of the surface characteristics as well as an included angle between opposing faces of the axial capillary slit.

9. The absorptive material according to claim 1 comprising at least two hollow fibers, wherein the hollow fibers are joined to each other by means comprising weaving, matting, braiding, knitting, felting, and filament winding.

10. The absorptive material according to claim 1 in which the total circumference of a round fiber with concentric walls is greater than $\pi D$.

11. A plurality of hollow fibers useful for the separation of immiscible liquids or at least one gas from at least one liquid, wherein each hollow fiber having at least one axial slit-shaped capillary along a substantial section of said fiber's length that provides an entrance from the fiber exterior to at least one internal fiber compartment; wherein said at least one slit-shaped axial capillary is formed by opposing overlapping, parallel, converging, or diverging capillary walls; the width of said capillary being proportional to the degree of the overlapping of the opposing walls and substantially greater than the separation distance between the opposing walls of said capillary; the interior surface of each opposing wall of said capillary being formed from an interior or exterior wall of said hollow fiber; wherein the interior wall surfaces of the at least one axial slit-shaped capillary, the wall surface of the at least one internal fiber compartment as well as the at least one exterior surface of the hollow fiber each having a surface characteristic selected from the group consisting of hydrophilic, oleophilic, hydrophobic and oleophobic.

12. The plurality of hollow fibers according to claim 11 wherein the interior surface of one opposing wall of said capillary is formed from an interior wall of said hollow fiber and the interior surface of the other opposing wall of said capillary is formed from an exterior wall of said hollow fiber.

13. The plurality of hollow fibers according to claim 11 wherein the interior surface of both opposing walls of said capillary are formed from interior walls of said hollow fiber.

14. The absorptive material according to claim 11 wherein the interior surface of both opposing walls of said capillary are formed from exterior walls of said hollow fiber.

15. The plurality of hollow fibers according to claim 11, wherein the width of said slit-shaped capillary is at least one to ten times greater than the separation distance between the opposing walls of said capillary.

16. The plurality of hollow fibers according to claim 11, wherein the opposing walls of said at least one axial slit-shaped capillary are separated by a distance of from 0.01 to 200 microns.

17. The plurality of hollow fibers according to claim 11, wherein the interior wall surfaces of the at least one axial slit capillary has a fluid separation characteristic resulting from any of the surface characteristics as well as an included angle between opposing faces of the axial capillary slit.

18. The plurality of hollow fibers according to claim 11 comprising at least two hollow fibers, wherein the hollow fibers are joined to each other by means comprising weaving, matting, braiding, knitting, felting, and filament winding.

19. The plurality of hollow fibers according to claim 11 in which the total circumference of a round fiber is greater than $\pi D$.

20. A fluid separation device useful for the separation of immiscible liquids or at least one gas from at least one liquid comprising a fluid inlet port, a fluid outlet port, a container, at least one chamber, and at least one chamber port, said fluid separation device comprising two distinct volumes that communicate with one another through the axial capillary slits in the hollow fibers; said first volume comprising the interior of the hollow fibers, the interior of the chamber wherein the hollow fibers are sealed in such as manner that their interior volumes are contiguous with one another, and the interior of the at least one chamber port that communicates from at least one chamber through the exterior wall of the device to the exterior of the device; said second volume comprising the interior volume of the container that is exterior to the hollow fibers, and the interior volumes of the fluid inlet port and the fluid outlet port; said hollow fibers each having at least one axial slit-shaped capillary along a substantial section of said fiber's length that provides an entrance from the fiber exterior to at least one internal fiber compartment; wherein said at least one slit-shaped axial capillary is formed by opposing overlapping, parallel, converging, or diverging capillary walls; the width of said capillary being proportional to the degree of the overlapping of the opposing walls and substantially greater than the separation distance between the opposing walls of said capillary; the interior surface of each opposing wall of said capillary being formed from an interior or exterior wall of said hollow fiber; wherein the interior wall surfaces of the at least one axial slit-shaped capillary, the wall surface of the at least one internal fiber compartment as well as the at least one exterior surface of the hollow fiber each having a surface characteristic selected from the group consisting of hydrophilic, oleophilic, hydrophobic and oleophobic.

21. The fluid separation device according to claim 20 wherein the interior surface of one opposing wall of said capillary is formed from an interior wall of said hollow fiber and the interior surface of the other opposing wall of said capillary is formed from an exterior wall of said hollow fiber.

22. The fluid separation device according to claim 20 wherein the interior surface of both opposing walls of said capillary are formed from interior walls of said hollow fiber.

23. The fluid separation device according to claim 20 wherein the interior surface of both opposing walls of said capillary are formed from exterior walls of said hollow fiber.

24. The fluid separation device according to claim 20, wherein the width of said slit-shaped capillary is at least one to ten times greater than the separation distance between the opposing walls of said capillary.

25. The fluid separation device according to claim 20, wherein the opposing walls of said at least one axial slit-shaped capillary are separated by a distance of 0.01 to 200 microns.

26. The fluid separation device according to claim 20, wherein the interior wall surfaces of the at least one axial slit capillary has a fluid separation characteristic resulting from any of the surface characteristics as well as an included angle between opposing faces of the axial capillary slit.

27. The fluid separation device according to claim 20 in which the total circumference of a round fiber with concentric walls is greater than $\pi D$.

28. The fluid separation device according to claim 20, in which there are more than one type of hollow fiber comprising axial capillary slits with different separation characteristics; each type of hollow fiber being joined and sealed to a different chamber having its own port.

29. The fluid separation device according to claim 20 in which the hollow fibers with axial capillary slits having the same separation characteristics are joined and sealed to chambers on both ends of the hollow fiber; each said chamber having its own port.

* * * * *